March 24, 1931. H. A. BODGE ET AL 1,797,677
BAKE OVEN
Filed Dec. 5, 1929
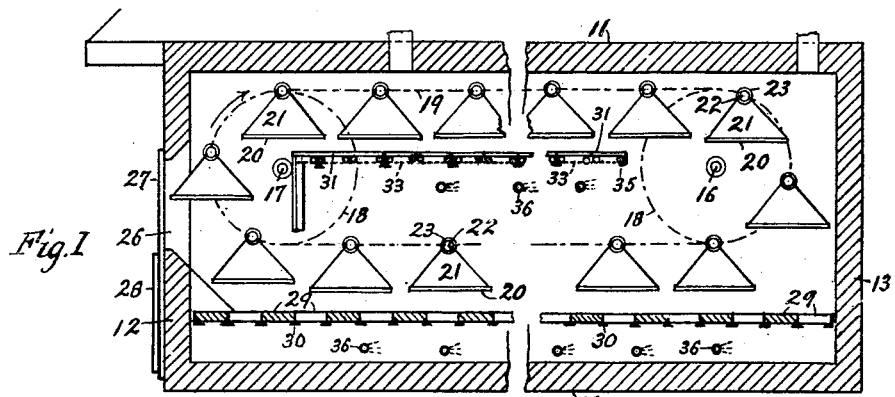
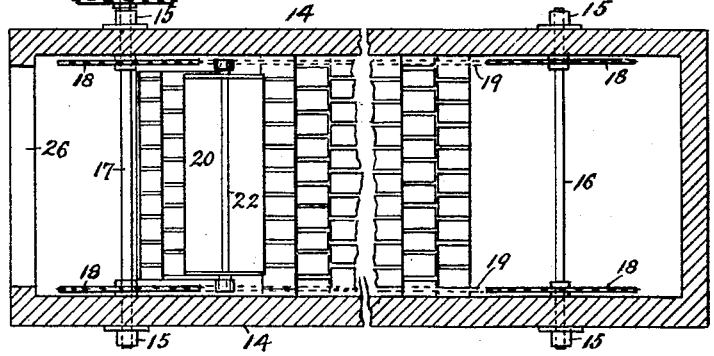
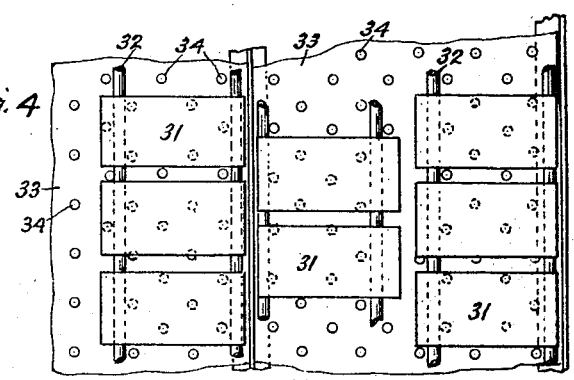
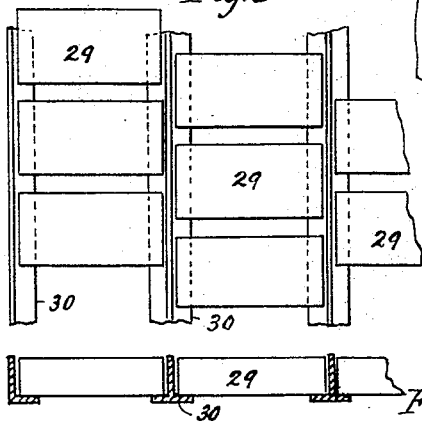

Patented Mar. 24, 1931

1,797,677

UNITED STATES PATENT OFFICE

HORACE A. BODGE, OF WHITE PLAINS, NEW YORK, AND JOSEPH C. EMLEY, OF MELROSE PARK, PENNSYLVANIA

BAKE OVEN

Application filed December 5, 1929. Serial No. 411,842.

The present invention relates to improvements in bake ovens of the class in which a series of trays are suspended on a continuously movable endless carrier, and arranged to receive and deliver respectively the unbaked and baked loaves in a continuous manner through a common door opening in the front wall of the oven.

The objects of the invention include means for breaking up and evenly distributing the baking heat within the oven at points along the path of the work and thus insure a more uniform bake in a comparatively short time.

A further object is to provide a heating tile adapted to resist the direct heat from the burners used and to thoroughly break up and diffuse said heat throughout its entire body.

For further comprehension of the invention, and of the objects and advantages thereof, reference is had to the following description and accompanying drawing, and to the appended claims in which the various features of the invention are more particularly set forth.

Figure 1 of the drawing is a longitudinal sectional elevation of the bake oven embodying the present invention, the length being shown as broken intermediate its ends.

Figure 2 is a sectional plan view thereof.

Figures 3 and 3a are respectively plan and side detail views showing the lower line of heating tiles.

Figures 4 and 5 are respectively plan and side detail views showing the upper line of heating tiles.

Figure 6 is a fragmental view showing manner of support for the tray-ends.

Numerals 10 and 11 of the drawing indicate respectively the main bottom and top walls of the oven, 12 and 13 the respective front and back walls, and 14 the side walls. Supported upon the latter walls are the exterior bearings 15 in which are rotatably mounted the carrier shafts 16 and 17, fixedly provided within the oven with the carrier wheels 18, engaged by the endless carrier chains 19, indicated in dotted lines. Suspended from the chains are a plurality of trays 20 having upwardly extending side arms 21, each carried upon a hanger shaft 22 provided at opposite ends with rollers 23, the latter adapted to bear and travel along the angle bars 24 secured to the opposite inner faces of the side walls 14, as shown in the enlarged detail view, Fig. 6. A driving wheel 25 is fixed upon the outer end of the carrier shaft 17 and is adapted to operate the carrier trays in a well-known continuous manner for the reception and delivery of the work through the door opening 26 in the front wall 12 of the oven, a door-frame 27 being indicated thereon, provided with a vertically movable door 28.

Disposed within the oven adjacent the bottom walls of the upper and lower lines of work-trays 20, are corresponding lines of heating tiles suitably carried upon metal bars extending laterally of the oven and supported by the side walls thereof. The lower line of tiles 29, shown in Figs. 3 and 3a are preferably composed of standard fire-brick loosely positioned in spaced relation along the flanges of the metal bars 30, the spacing of the tiles along adjacent bars being in offset relation as shown. The upper line of tiles 31, shown in enlarged detail view in Figs. 4 and 5, are preferably composed of standard fire-brick 31 arranged in spaced relation in lines extending transversely of the oven and supported at opposite ends upon round rods 32, the latter in turn being carried by corrugated metal plates 33 provided with staggered perforations 34, and for carrying the corrugated plates, flanged metal bars 35 are provided that extend transversely of the oven and receive their support from the side walls of the latter, the flanges of the metal bars being positioned below the side edges of the plates and the superposed rods, the latter acting as spacing blocks to afford clear passages between the upper surfaces of the plates and the bottom faces of the tiles. The staggered perforations in the plates extend along the extreme upper convex faces 33a thereof and serve to distribute the heated air over the bottom faces of the tiles and through the spaces therebetween, thus providing a heat distributing device adapted to receive heat from a plurality of burners and transmit the same in a uniform manner to the material to be baked.

Within the oven and extending transversely thereof are a multiple series of burners 36, preferably gas, disposed adjacent the bottom faces of the upper and the lower lines of tiles, the burners being of conventional type adapted for separate regulation at various points within the oven.

In the baking operation the work-trays are advanced in the direction shown by the arrow in Fig. 1, and the material to be baked is subjected in its forward passage of the upper line of tiles, and in their return or backward passage, to the lower line of tiles. In baking loaves of bread, a relatively large amount of contained moisture is caused to be removed during the forward passage through the oven, and it will be obvious that in order to obtain an even baking action the heat applied must be transmitted in a correspondingly uniform manner.

What we claim as our invention and desire to secure by Letters Patent, is:

1. A heat distributing device as described comprising a corrugated plate, a tile carried by said plate in spaced relation therewith, means for thermally connecting said plate and tile in spaced relation to each other, and means for heating said plate.

2. A heat distributing device as described comprising a corrugated plate having perforations therein, a tile carried by said plate in spaced relation therewith, and means for jointly supporting said plate and tile.

3. A heat distributing device as described comprising a corrugated plate having perforations extending along the upper convex faces thereof, a tile carried by said plate in spaced relation therewith, and means for jointly supporting said plate and tile.

4. A heat distributing device as described comprising a corrugated plate having perforations extending along the upper convex faces thereof, a plurality of tiles carried by said plate in spaced relation therewith, and means for jointly supporting said plate and tiles.

5. A heat distributing device as described comprising a corrugated plate having perforations extending along the upper convex faces thereof and adapted for the reception of heat along its lower face, a plurality of tiles carried by said plate in spaced relation therewith, the said tiles being disposed in a plurality of lines wherein they are spaced apart from one another in offset relation with respect to adjacent lines, and means for jointly supporting said plate and tiles.

6. A heat distributing device as described comprising a corrugated plate adapted for the reception of heat along the lower face thereof, a plurality of tiles carried by said plate in spaced relation therewith, the said tiles being disposed in a plurality of lines wherein they are spaced apart from one another in offset relation with respect to adjacent lines, and means for jointly supporting said plate and tiles.

Signed at New York in the county of New York and State of New York this 25th day of November A. D. 1929.

HORACE A. BODGE.
JOSEPH C. EMLEY.